United States Patent [19]
Cook, Jr.

[11] 3,934,154
[45] Jan. 20, 1976

[54] SOURCE OF ULTRAVIOLET LIGHT EMPLOYING A LASER PUMPED BORATE CRYSTAL

[76] Inventor: William R. Cook, Jr., 684 Quilliams Road, Cleveland Heights, Ohio 44121

[22] Filed: Feb. 18, 1975

[21] Appl. No.: 550,526

Related U.S. Application Data

[63] Continuation-in-part of Ser. No. 472,995, May 24, 1974, abandoned.

[52] U.S. Cl. .............................. 307/88.3; 321/69 R
[51] Int. Cl.² .......................................... G02F 1/37
[58] Field of Search .................. 302/88.3; 321/69 R

[56] References Cited
UNITED STATES PATENTS 3,721,831   3/1973   Bergman et al. .................... 307/88.3

Primary Examiner—R. V. Rolinec
Assistant Examiner—Darwin R. Hostetter
Attorney, Agent, or Firm—Eber J. Hyde

[57] ABSTRACT

This invention pertains to an ultraviolet light generator which mixes, or frequency doubles, light by means of a borate crystal such as $AB_5O_8 \cdot 4H_2O$ where A=Ammonium ($NH_4$), Potassium (K), Rubidium (Rb), or Cesium (Cs). This ultraviolet light generator is pumped with a dye laser capable of emitting coherent light of wavelengths from 4000 to 5600 A (Angstroms) to generate phase matched second harmonics between about 2150 A and 2650 A, a range not readily attained by systems using other crystals.

6 Claims, 6 Drawing Figures

SOURCE OF ULTRAVIOLET LIGHT EMPLOYING A LASER PUMPED BORATE CRYSTAL

This application is a continuation-in-part application of applicant's copending application Ser. No. 572,995, filed May 24, 1974, now abandoned.

BACKGROUND OF THE INVENTION

This invention concerns crystals for nonlinear optical devices, in particular for the generation of coherent ultraviolet light by mixing or frequency doubling of longer wavelength light.

Crystals for nonlinear optical applications are normally found among those materials which lack a center of symmetry and are at least weakly piezoelectric. Numerous examples of nonlinear optical crystals have been discovered in recent years, most of which were already known to be piezoelectric. It was quickly found that tremendous enhancement of the second harmonic generation intensity was obtained under phase-matched conditions, i.e., when the index of refraction of the primary beam equals that of the doubled frequency vibrating at right angles to the direction of the primary beam (1). The wide range of crystals now available allows phase matching over a wide range of wavelengths, not including, however, the ultraviolet below 2300 A. The reason for this is that most materials strongly absorb light of these lower wavelengths, which eliminates or greatly reduces UV intensity. A second problem is the phase matching requirement. All materials which are transparent in the visible eventually reach an absorption edge in the UV. As this absorption edge is approached the indices of refraction increase at an increasingly rapid rate, effectively eliminating any possibility of phase matching. At present, two crystals which are used for phase matched frequency doubling into the UV are ammonium dihydrogen phosphate (ADP) which will room-temperature phase match to about 2624 A (2), and the recently reported lithium formate monohydrate, which is limited by ultraviolet absorption to 2360 A and above (3). A crystal which will phase match somewhat farther into the UV is most desired.

SUMMARY OF THE INVENTION

According to this invention, crystals of the type $AB_5O_8 \cdot 4H_2O$, with $A=K$, $NH_4$, Rb, or Cs allow phase matched second harmonic generation farther into the ultraviolet than previously known materials. The effect is somewhat weaker than that of ammonium dihydrogen phosphate, but is strong enough to be useful. Light transmission is high even below 2000 A. Thus it is the primary object of the invention to provide an optical system utilizing one member of a particular crystal family for phase-matched frequency doubling farther into the ultraviolet range than has heretofore been achieved.

BRIEF DESCRIPTION OF THE DRAWINGS

Further features and advantages of this invention will become apparent from the following detailed description, taken together with the drawings wherein.

DETAILED DESCRIPTION OF ILLUSTRATIVE EMBODIMENT

The invention will now be described in detail for the particular case of a single wavelength illumination of the nonlinear crystal element. The modification for obtaining the sum frequency of light of two different wavelengths follows methods well known to those skilled in the art.

Figure 1:
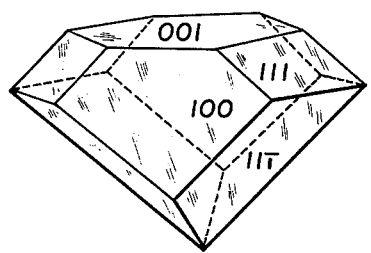
FIG. 1 shows the potassium pentaborate crystal.
Figure 2:
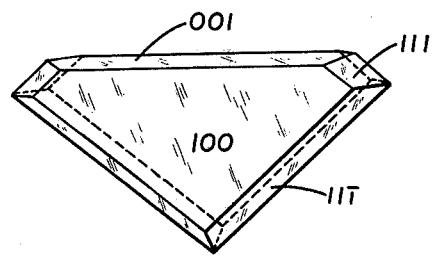
FIG. 2 shows the ammonium pentaborate crystal.

In FIGS. 1 and 2, typical crystals of pentaborates are shown. For example, the potassium pentaborate crystal of FIG. 1 is pictured as it appears when grown from a solution made by dissolving one mole of KOH and between 3.5 and 5 moles of $HBO_3$ in aqueous solution and slowly cooling from 45°C to room temperature.

FIG. 2 shows a typical crystal of ammonium pentaborate, grown in a similar manner.

Figure 3:
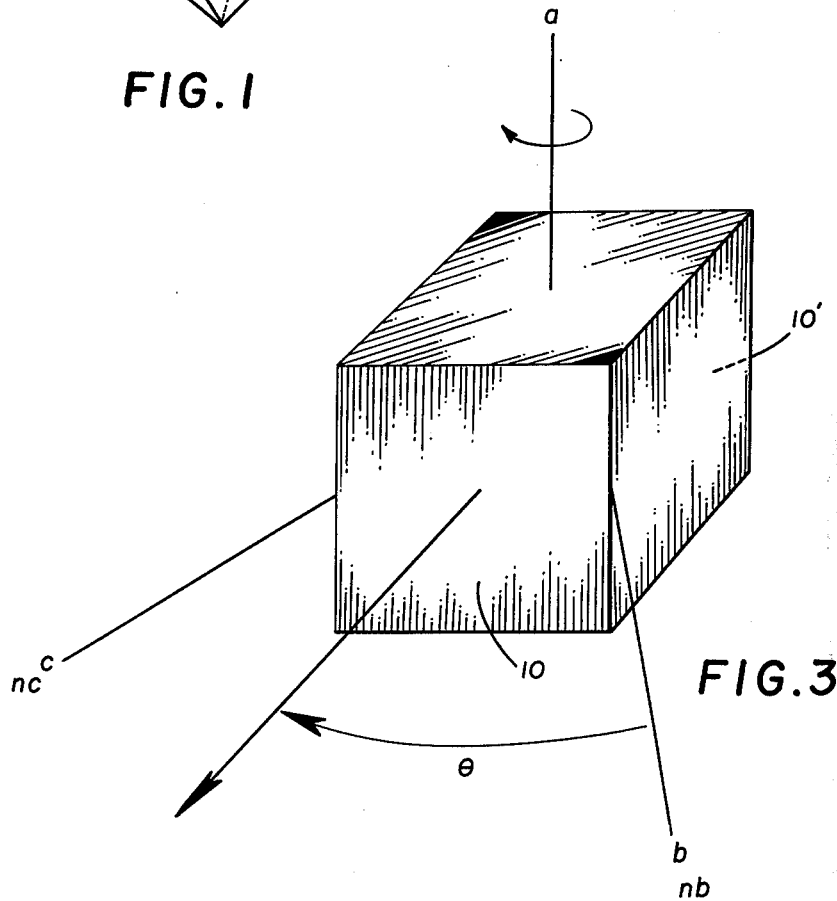
FIG. 3 shows the orientation of the crystal element.

FIG. 3 shows an oriented piece of such a crystal ready for use a frequency doubler, with the polished parallel front and back faces indicated by reference characters 10 and 10'. The directions of the vibration directions of the indices of refraction ($na$, $nb$, $nc$) are shown; the angle $\theta$ designates the rotation of the direction of the primary beam from the $b$ axis toward the $c$ axis, and may be in any position from 0° to 90°. The choice of $\theta$ depends on which of the pentaborate crystals is used and also the desired ultraviolet wavelength for the doubled frequency. While good practice makes desirable a close parallelism between the direction of the light and the normal to the polished faces, it is not necessary that these two directions be identical, as is well known in the art.

It should be pointed out that some confusion on the crystal axes of the pentaborates existed in the literature prior to 1957. For this reason, the axes being used are herein defined as those of Cook and Jaffe in 1957 (4), repeated here for convenience, and conforming to the crystals pictured in FIGS. 1 and 2.

Potassium pentaborate: $a = 11.065$A, $b = 11.171$A, $c = 9.054$A.
Ammonium pentaborate: $a = 11.324$A, $b = 11.029$A, $c = 9.235$A.

These crystals, and in addition rubidium pentaborate and cesium pentaborate, are isostructural.

Figure 4:
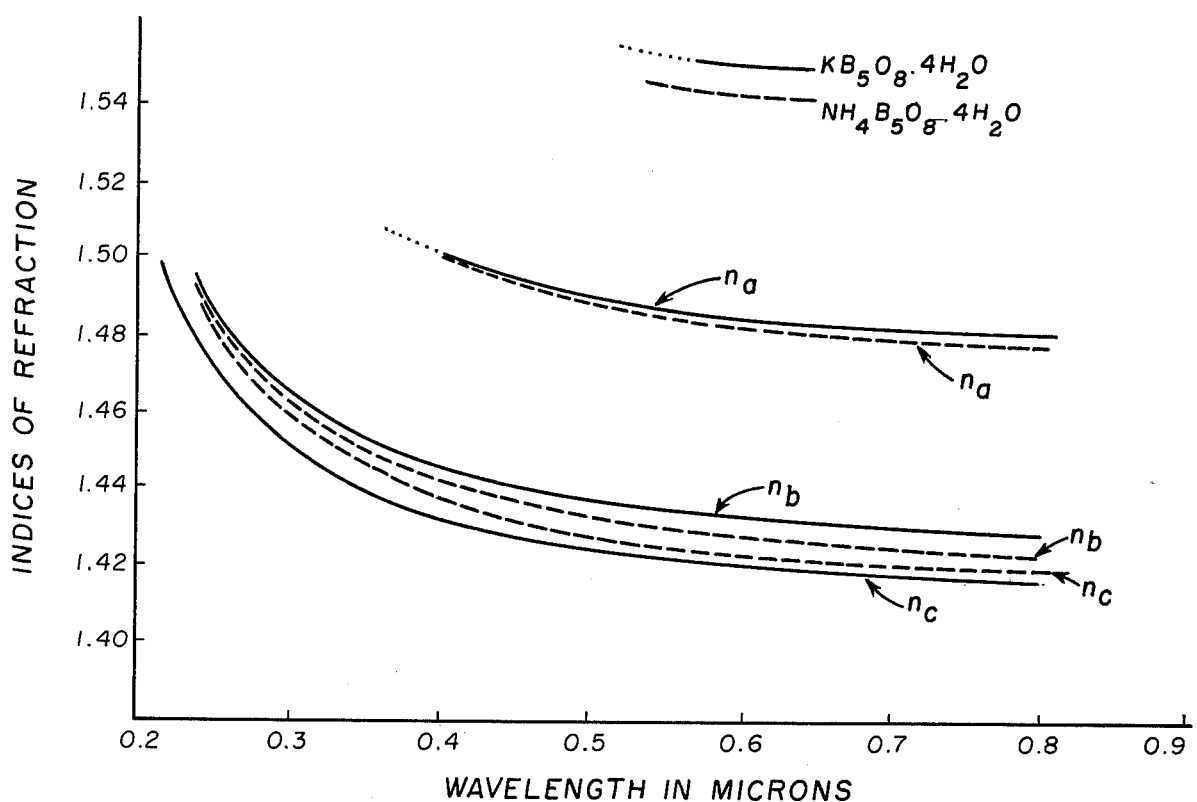
FIG. 4 is a graph showing wavelength versus index of refraction of two crystal elements.

In FIG. 4 are shown the indices of refraction of the K and $NH_4$ pentaborate crystals as presently known. Dotted and dashed areas of the curves are known with less precision. From data such as these, the phase matched angles for a wavelength in the ultraviolet may be calculated, according to methods well known in the art.

Figure 5:
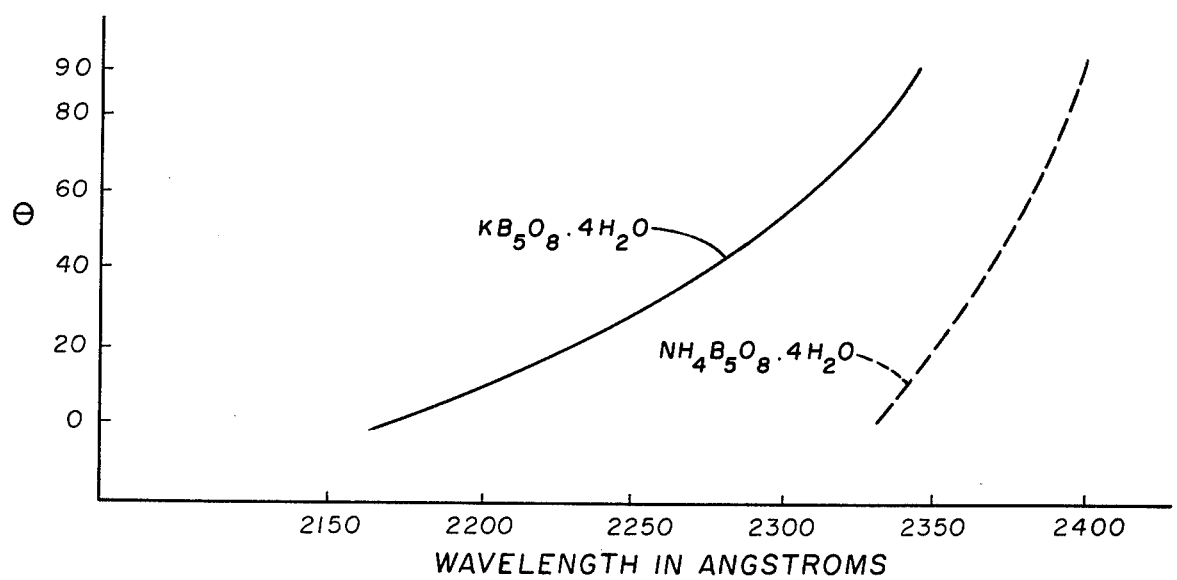
FIG. 5 is a graph showing wavelength versus angle of rotation $\theta$ of two crystal elements.

In FIG. 5 is shown the phase matched angle for each wavelength; the angles are exact for potassium pentaborate, but are only approximate for ammonium pentaborate. It should be noted that the doubled frequencies attainable are not limited to those shown in FIG. 5. By rotating around a second axis one can obtain additional wavelengths in the near ultraviolet. The calculation of such rotation angles is well known in the art. In order to remain in the more useful regions of the spectrum, it should be no more than 45°. The novel feature is the existence of indices of refraction changing so slowly in the ultraviolet as to allow phase matching well below 2500 A, as shown in FIG. 5.

Figure 6:
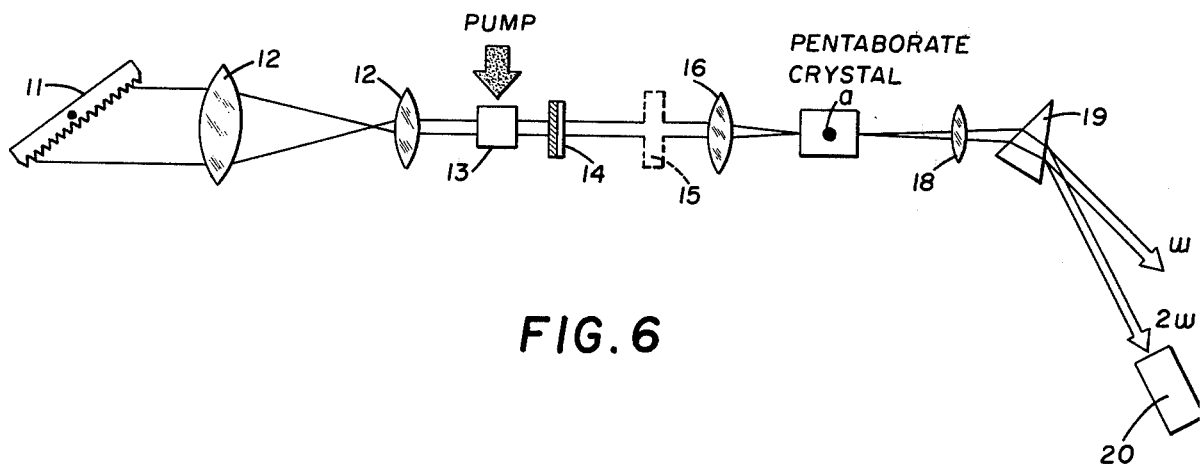
FIG. 6 shows a block diagram of a typical system embodying a crystal element.

In FIG. 6, light of the desired fundamental wavelength from a nitrogen laser-pumped dye laser 13 operating in the range 4000 to 5600 A passes through a pentaborate crystal 17, which is rotatable around the $a$ axis (as shown) or tilted towards the $a$ axis (not shown), and a second harmonic is produced in the pentaborate crystal at a wavelength between 2150 and 2650 A. units. The light is then fed through a fused quartz collimating lens 18 and a fused quartz prism 19 which latter separates the second harmonic from the fundamental beam and allows it to be used. In FIG. 6 it is shown being fed into a detector 20, but this could be any desired utilization apparatus, such as a material whose ultraviolet absorption spectrum is to be studied, for instance. In this latter case, the material to be studied would be interposed between the fused quartz prism 19 and the detector 20.

Other features of FIG. 6 are the Echelle grating 11 which serves as one cavity mirror and controls the laser linewidth, a focusing lens 12, the output mirror 14 which serves as the other side of the cavity; variable attenuators 15 in case it is desired to reduce the intensity of the second harmonic, and a focusing lens 16 for the crystal 17.

Current data on the value of the nonlinear optical coefficient for potassium pentaborate in the useful direction indicate that in the vicinity of 2800 A (doubled frequency) it is about one-seventh of that of ADP at the same wavelength. This is of sufficient magnitude to obtain useful intensity of ultraviolet light variable continuously over a range from 2800 A to about 2150 A by frequency doubling the light from a variable frequency dye laser.

While the setup of FIG. 6 represents one useful embodiment of the invention, it only serves as an illustration; the invention should not be construed as limited to this setup. Any sufficiently powerful laser source in any reasonable configuration which provides the desired range of fundamental wavelengths will be satisfactory. Alternatively, the light from a variable frequency coherent source, such as a dye laser, may be mixed with a powerful fixed frequency laser such as an argon ion laser. The various configurations of lenses and attenuators shown represent a convenient configuration, and can be modified to fit the desires of the user, as will be recognized by anyone skilled in the art. Additionally, while the previous discussion is limited to room temperature operation, cooling the crystal element typically extends the operating range farther into the ultraviolet, as is known to those skilled in the art.

REFERENCES:

1. G. C. Baldwin, *An Introduction to Nonlinear Optics*, Plenum Press, New York (1974).
2. Calculated from the indices of refraction of F. Zernike Jr., "Refractive Indices of Ammonium Dihydrogen Phosphate and Potassium Dihydrogen Phosphate between 2000 A and 1.5 micron", J. Opt. Soc. Am. 54, 1215–18 (1964).
3. F. B. Dunning, F. K. Tittel, and R. F. Stebbings, "Generation of Tunable Coherent Radiation in the Wavelength Range 2300–3000 A Using Lithium Formate Monohydrate", Opt. Commun. 7, 181–3 (1973).
4. W. R. Cook Jr. and Hans Jaffe, "The Crystallographic, Elastic, and Piezoelectric Properties of Ammonium Pentaborate and Potassium Pentaborate", Acta Cryst. 10, 705–7 (1957).

What is claimed is:

1. A device for the generation of coherent light in the wavelength range from 2000 A to 2800 A comprising an optically nonlinear crystal element of a pentaborate compound of the formula $AB_5O_8 \cdot 4H_2O$, with A from the group $NH_4$, K, Rb, or Cs, and means to illuminate said crystal element with coherent light of at least wavelength greater than 2800 A.

2. An optical second harmonic generator of the type in which a transparent crystal having a significant second order nonlinear coefficient is pumped by a fundamental optical beam to produce a second harmonic optical beam of a wavelength below 2800 A, said generator being characterized in that the said crystal is a crystal of a pentaborate compound of the formula $AB_5O_8 \cdot 4H_2O$, with A from the group $NH_4$, K, Rb, or Cs.

3. A generator of the type claimed in claim 2, characterized in that said crystal is a crystal of potassium pentaborate, $KB_5O_8H_2O$.

4. A generator of the type claimed in claim 2, characterized in that said crystal is a crystal of ammonium pentaborate, $NH_4B_5O_8 \cdot 4H_2O$.

5. A generator of the type claimed in claim 3, wherein the direction of optical transmission is rotated from the $b$ axis towards the $c$ axis in any position from 0° to 90°, and is rotated towards $a$ no more than 45°.

6. A generator of the type claimed in claim 4, wherein the direction of optical transmission is rotated from the $b$ axis towards the $c$ axis in any position from 0° to 90° and is rotated towards $a$ no more than 45°.

* * * * *